United States Patent Office 3,077,490
Patented Feb. 12, 1963

3,077,490
PREPARATION OF ALUMINUM HYDROCARBYLS
Herbert B. Fernald, Glenshaw, Pa., assignor to Goodrich-Gulf Chemicals, Inc., Cleveland, Ohio, a corporation of Delaware
No Drawing. Filed May 8, 1959, Ser. No. 811,775
9 Claims. (Cl. 260—448)

This invention relates to the preparation of aluminum hydrocarbyls through the direct reaction of aluminum with olefinic hydrocarbons and hydrogen.

Aluminum hydrocarbyls, for example, the aluminum alkyls, have become important chemical tools. They have achieved widespread interest as catalysts or catalyst components in the polymerization of olefins and as intermediates in the synthesis of alcohols from olefins.

In my copending application, Serial No. 612,117, filed September 26, 1956, and assigned to the same assignee as the instant application, it is disclosed and claimed that aluminum can be readily and quickly activated for reaction with an olefinic hydrocarbon and hydrogen to form aluminum hydrocarbyls by contacting the aluminum with an activating material such as the alkali metals and the alkaline earth metals. In this manner, the mechanical activation of the aluminum by grinding in a ball mill, colloid mill or the like is obviated.

It has now been found that another class of activating materials can be utilized in place of those disclosed in my copending application. In accordance with the present invention, aluminum hydrocarbyls, including trihydrocarbyl aluminums and hydrocarbyl aluminum hydrides, are prepared by contacting metallic aluminum with an activating amount of an organoalkali selected from the class consisting of the alkyl, aralkyl, aryl and alkaryl alkalis and reacting the activated aluminum with an olefinic hydrocarbon and hydrogen to obtain an aluminum hydrocarbyl product. The activation can be conducted substantially simultaneously with the synthesis of the aluminum hydrocarbyls, that is, the aluminum is reacted in the presence of the activator with an olefinic hydrocarbon and hydrogen; or the aluminum can be activated separately by contact with the activator, and then reacted with the olefinic hydrocarbon and hydrogen. The former procedure is preferred. In any event, no mechanical subdivision of the aluminum is required for the activation. The activation may be, and preferably is, conducted in the same vessel employed for the reaction.

The reaction between the activated aluminum, the olefin and hydrogen proceeds according to the following equation in which isobutylene is employed as the olefin for purposes of illustration:

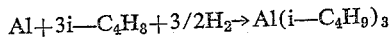

$$Al + 3i\text{—}C_4H_8 + 3/2H_2 \rightarrow Al(i\text{—}C_4H_9)_3$$

Some hydride, for example, diisobutyl aluminum hydride, may be formed at the same time either directly or by decomposition of the trihydrocarbyl aluminum. Such mixtures of trihydrocarbyl aluminum and hydrocarbyl aluminum hydride can be employed as polymerization catalysts. However, if desired, the crude hydride-containing product can be converted quite completely to the trihydrocarbyl by reacting with excess olefin. Alternatively, the crude product can be distilled to separate the hydride from the trihydrocarbyl.

In the activation of the aluminum and in the synthesis reaction, it is preferred, as disclosed in my copending application, that the aluminum be relatively finely divided. For example, atomized aluminum powders of average particle diameters of 9 microns, 25 microns and 30 microns are used successfully. However, considerably coarser materials can also be employed. For example, aluminum turnings of the approximate dimensions ⅛" x 1" x ½₂" are also suitable. The extent of subdivision of the aluminum is therefore not critical.

If desired, the activator may be employed as a dispersion or in solution in a solvent inert to the hydrocarbyl synthesis reaction. These inert solvents are described in detail hereinafter in connection with the synthesis reaction and include such materials as the saturated aliphatic hydrocarbons and the aromatic hydrocarbons. In some instances, for example with activators such as methylsodium, the aromatic hydrocarbon solvents such as benzene are not inert to the activator. Thus, methylsodium metalates benzene to form phenylsodium. However, since phenylsodium itself is an activator for the aluminum, the reactivity of the alkylsodium toward aromatic hydrocarbon solvents is not material. If desired, an unreactive aliphatic hydrocarbon can be employed. The concentration of activator in solvent is not critical.

The activating materials of the invention include the alkyl, aralkyl, aryl and alkaryl alkalis. These compounds have the general formula RM, where R is an alkyl, aralkyl, aryl or alkaryl radical and M is lithium, sodium, potassium, rubidium or cesium. Representative compounds suitable as activating materials include ethyllithium, propyllithium, butyllithium, benzyllithium, tolyllithium, triphenylmethyllithium, methylsodium, ethylsodium, propylsodium, amylsodium, triphenylmethylsodium, phenylsodium, ethylpotassium, phenylisopropylpotassium, ethylrubidium and ethylcesium. The sodium and lithium compounds are preferred.

In general, the activators are employed in small amounts, sufficient to activate the aluminum. Trace amounts up to about 25 percent by weight of the activator, based on the weight of the aluminum are successfully employed, but ordinarily from about 1 to about 10 percent is sufficient. Within the amounts stated, it is preferred to use the larger amounts of organo-alkali activator when the molecular weight of the alkali metal portion thereof is lower and/or when the molecular weight of the organo portion thereof is higher. For example, more of butyllithium may be employed than butylsodium, and more of phenylsodium than butylsodium or propylsodium.

As disclosed in my copending application, any olefinic hydrocarbon is employed in the preparation of hydrocarbyl aluminum compounds in accordance with the invention. Suitable olefinic hydrocarbons include the straight and branched chain aliphatic mono-olefins, alicyclic olefins, the corresponding diolefins and the aryl olefins. For example, ethylene, propylene, butene-1, butene-2, isobutylene, pentene-1, pentene-2, hexene-1, 2-methyl pentene-1, the mixed heptenes obtained by the copolymerization of propylene and butylenes in the presence of a phosphoric acid catalyst, octene-1, octene-2, 2-ethyl hexene-1, diisobutylene, propylene trimer, decene-1, propylene tetramer, triisobutylene and the like are satisfactorily employed. Similarly, cyclopentene, cyclohexene and their alkyl derivatives, styrene, alpha-methylstyrene, indene and the like form hydrocarbyl aluminum compounds. Butadiene, isoprene, piperylene, hexadiene (diallyl) comprise suitable diolefins. Mixtures of the above olefins, as well as mixtures such as are obtained in refinery gas, or by the thermal cracking of paraffin wax, foots oil, or relatively paraffinic liquid petroleum fractions can also be employed. The terminal or alpha mono-olefins form a preferred class. The specifically preferred alpha monoolefin is isobutylene. This olefin is relatively cheap, readily available and easily forms triisobutyl aluminum in accordance with the invention.

In the practice of the aluminum hydrocarbyl synthesis, the presence of a liquid phase is desirable. This liquid can be a solvent inert to the synthesis reaction, an aluminum hydrocarbyl product or a liquid olefinic hydrocarbon reactant. Suitable inert solvents are the saturated aliphatic hydrocarbons, such as the pentanes, hexane, cyclohexane, heptane, octane and the like, the aromatic hydrocarbons, such as benzene, toluene and the xylenes, and any mixtures thereof. In a preferred embodiment the liquid employed is the same aluminum hydrocarbyl reaction product that is to be prepared. This aluminum hydrocarbyl can be a trihydrocarbyl aluminum, a dihydrocarbyl aluminum hydride, or a mixture thereof. This has the advantage of eliminating the recovery of the aluminum hydrocarbyl product from solvent. When the olefinic hydrocarbon reactant is a liquid under the reaction conditions employed, no additional liquid need be employed. It is advantageous to have one of the described liquids present in the synthesis process of this invention in order to insure efficient contact between the solid aluminum, gaseous hydrogen and the olefinic hydrocarbon which may or may not be liquid. Because of the diverse phases present, good agitation is required and the efficiency of contact between the reactants induced by agitation is enhanced by the presence of liquid. The amount of inert solvent or hydrocarbyl aluminum product, when employed, is not critical. A sufficient amount is used to give a reaction mass which can readily be stirred. For example, an amount of inert solvent or hydrocarbyl aluminum equal to the weight of the aluminum reactant gives good results. When the olefinic hydrocarbon reactant constitutes the liquid phase, the amount employed is governed by its proportion as a reactant, as hereinafter described.

In view of the consumption of hydrogen in the reaction to form an aluminum hydrocarbyl, it is preferred to employ superatmospheric pressures at the reaction temperatures. Pressures as low as 500 pounds per square inch gauge can be employed, but higher pressures promote faster reaction rates. There have been used pressures ranging from about 1200 to 3400 p.s.i.g., but still higher pressures are also suitable. When a separate activation procedure is followed, that is, when the aluminum is first contacted with the activator for a period of time before the reaction with the olefinic hydrocarbon and hydrogen, atmospheric pressures can be employed as well as the higher pressures disclosed hereinabove for the aluminum hydrocarbyl synthesis reaction.

In conducting the synthesis reaction in the presence of the activator, the temperature of the reaction can be maintained in the range of about 100° to 240° C., or higher. The reaction is mildly exothermic. At reaction temperatures below about 125° C., the reaction, though observable, is slow. To obtain good synthesis reaction rates, a temperature range of about 150° to 185° C. is preferred. When the separate activation procedure is followed, temperatures ranging from room temperature to about 200° C. can be employed for this purpose.

The aluminum, olefinic hydrocarbon and hydrogen can be employed in the proportions in which they react to form a trihydrocarbyl aluminum product, that is, 3 mols of olefinic hydrocarbon per mol of aluminum and 1½ mols of hydrogen per mol of aluminum. However, these exact proportions need not be followed since an aluminum hydrocarbyl product will be obtained from significant amounts of these materials in any proportion. In the actual practice of the invention to obtain aluminum hydrocarbyls, including trihydrocarbyl aluminum and dihydrocarbyl aluminum hydride, a 10 to 40 percent by weight excess of olefin over the amount theoretically required to produce trihydrocarbyl aluminum has been employed successfully. With respect to the hydrogen, a large excess over the theoretical has been employed to maintain the desired reaction pressure.

When conducting the synthesis in the presence of activator, the reactants and activator can be charged to the reactor substantially simultaneously or in any desired order, and then brought to reaction temperature.

The activated aluminum and aluminum hydrocarbyls are strong reducing agents and react readily with such materials as oxygen, moisture and carbon dioxide. Accordingly, in the activation of the aluminum and in the synthesis of the hydrocarbyls, an atmosphere of a dry inert gas is provided, for example, nitrogen, argon, helium or the like. Similarly, in the working up and storage of the hydrocarbyl reaction products, an inert atmosphere is provided.

In the actual practice of a preferred embodiment of the invention, a stirred autoclave is employed as the reactor. While maintaining an atmosphere of nitrogen therein, the autoclave is charged at room temperature with the aluminum, the inert solvent, if it is to be employed, is added, and the activator is then added. The autoclave is then closed. The olefinic hydrocarbon in the desired proportion is then pressured into the autoclave with nitrogen, and the hydrogen reactant is then pressured in to give the desired amount of hydrogen. The autoclave is then heated with stirring to the desired reaction temperature. As the reaction begins and continues, a drop in pressure is observed. After a pressure drop in the range of about 200 to 600 p.s.i.g., the autoclave is repressured to the original pressure with additional hydrogen. This repressuring with hydrogen is continued throughout the course of the reaction until the rate of drop in pressure becomes negligible. At that point the reaction is considered complete. The contents of the autoclave are then cooled to room temperature and the autoclave is vented to atmospheric pressure. The reaction product is pressured out of the autoclave with nitrogen and into a filter, where any solids such as unreacted aluminum are filtered off under nitrogen pressure. The filtrate is then subjected to a vacuum to remove any dissolved gases, and is stored under an atmosphere of inert gas.

The following examples are further illustrative of the invention.

*Example 1*

While maintaining an atmosphere of nitrogen in a 2-liter autoclave equipped with means for agitation, heating and cooling, charge through a port in the cover 54 grams (2 mols) of an atomized aluminum powder having an average particle size of 9 microns. The screen analysis of this aluminum powder showed 99.9 percent through a 200 mesh screen and 97 percent through a 325 mesh screen. Then add in a similar manner 2.56 grams of butyllithium (4.74 percent by weight of the aluminum) in solution in petroleum ether and 46 grams of crude triisobutyl aluminum (containing diisobutyl aluminum hydride). Close the port and pressure into the autoclave 421 grams (7.5 mols) of liquid isobutylene with nitrogen. Add to the autoclave gaseous hydrogen until a pressure of 1800 p.s.i.g. is attained. This represents about 3.5 mols of hydrogen. While agitating vigorously, heat the contents of the autoclave to 165° C. and maintain this temperature throughout the reaction. The pressure at this temperature is about 2800 p.s.i.g. The reaction starts in about 20 minutes as evidenced by a drop in pressure. When a pressure of 2500 p.s.i.g. is reached, hydrogen is pressured in until the original pressure of 2800 p.s.i.g. is attained. Thereafter, the reaction is allowed to continue with hydrogen repressuring as just described until the rate of drop in pressure is negligible, a period of 1½ hours. The contents of the autoclave are cooled to about 30° C. and the autoclave is then vented to atmospheric pressure. The reaction product is then pressured out of the autoclave with nitrogen into a filter and filtered under a nitrogen atmosphere. The filtrate is subjected to a vacuum of about 10 to 15 mm. Hg at a temperature of about 35° to 40° C. to remove any dissolved hydrogen, nitrogen, petroleum ether, isobutylene and isobutane which may be formed by hydrogenation of the isobutylene. The amount of isobutyl aluminum product is 414 grams, representing a yield of 90.4 percent based on the aluminum charged. The product, a water-white liquid, analyzes 13.2 percent aluminum (theroetical for triisobutyl aluminum, 13.64 percent) and contains 82.2 percent of triisobutyl alumnium and 15.4 percent of diisobutyl aluminum hydride.

*Example 2*

Repeat the above example, except employ 5.9 grams of phenylsodium (10.9 percent by weight of the aluminum) in a 10 percent by weight dispersion in benzene, 59 grams of crude triisobutyl aluminum, and 405 grams isotubylene. The reaction starts in about 90 minutes and is complete in 2¼ hours. Three hundred seventy-four (374) grams of product are obtained representing a yield of 73.2 percent, based on the aluminum. The crude product analyzes 12.72 percent aluminum and contains 81.6 percent triisobutyl alumnium and 8.0 percent of diisobutyl aluminum hydride.

While the above examples have shown the use of isobutylene as the olefinic hydrocarbon, the other olefins disclosed herein and in my copending application are also successfully employed. Similarly, the other specific organoalkalis disclosed herein are successfully employed in place of the butyllithium and phenylsodium of the examples.

As has been shown hereinabove, aluminum can be activated for the production of aluminum hydrocarbyls without requiring costly and time-consuming mechanical subdivision of the aluminum. The activation is simply and quickly accomplished without the necessity of transferring activated aluminum to a separate reaction vessel, thereby eliminating safety hazards and further reducing manufacturing costs.

Resort may be had to such modifications and variations as fall within the spirit of the invention and the scope of the appended claims.

I claim:

1. A process for the preparation of aluminum hydrocarbyls which comprises contacting aluminum with an activating amount of an organoalkali selected from the class consisting of the alkyl, aralkyl, aryl and alkaryl alkalis in the presence of an aluminum hydrocarbyl and reacting the aluminum with an olefinic hydrocarbon and hydrogen to obtain an aluminum hydrocarbyl.

2. A process for the preparation of aluminum hydrocarbyls which comprises reacting aluminum with an olefinic hydrocarbon and hydrogen in the presence of an activating amount of an organoalkali selected from the class consisting of the alkyl, aralkyl, aryl and alkaryl alkalis to obtain an aluminum hydrocarbyl.

3. A process for the preparation of aluminum hydrocarbyls which comprises reacting aluminum with an aliphatic mono-olefin and hydrogen in the presence of from a trace to about 25 percent by weight, based on the weight of the aluminum, of an organoalkali selected from the class consisting of the alkyl, aralkyl, aryl and alkaryl alkalis at an elevated temperature and pressure to obtain an aluminum hydrocarbyl.

4. The process of claim 3, wherein the temperature is in the range from about 100° to 240° C. and the pressure is in the range from about 500 to 3400 p.s.i.g.

5. A process for the preparation of aluminum hydrocarbyls which comprises reacting aluminum with an alpha mono-olefin and hydrogen in the presence of about 1 to 10 percent by weight, based on the aluminum, of an organoalkali selected from the class consisting of the alkyl, aralkyl, aryl and alkaryl alkalis at a temperature of about 150° to 185° C. and a pressure of about 1200 to 3400 p.s.i.g. to obtain an aluminum hydrocarbyl.

6. The process of claim 5, wherein the alpha mono-olefin is isobutylene.

7. A process for the preparation of an isobutyl aluminum which comprises reacting aluminum with isobutylene and hydrogen in the presence of about 1 to 10 percent by weight of butyllithium, based on the aluminum, and in a liquid isobutyl aluminum product of the reaction at a temperature of about 150° to 185° C. and a pressure of about 1200 to 3400 p.s.i.g. to obtain an isobutyl aluminum.

8. A process for the preparation of aluminum hydrocarbyls which comprises reacting aluminum with an alpha mono-olefin and hydrogen in the presence of an aluminum hydrocarbyl and from a trace to about 25 percent by weight, based on the aluminum, of an organoalkali selected from the class consisting of the alkyl, aralkyl, aryl and alkaryl alkalis at an elevated temperature and pressure to obtain an aluminum hydrocarbyl.

9. A process for the preparation of aluminum hydrocarbyls which comprises reacting aluminum with an alpha mono-olefin and hydrogen in the presence of an aluminum hydrocarbyl and about 1 to 10 percent by weight, based on the aluminum, of an organoalkali selected from the class consisting of the alkyl, aralkyl, aryl and alkaryl alkalis at a temperature of about 150° to 185° C. and a pressure of about 1200 to 3400 p.s.i.g. to obtain an aluminum hydrocarbyl.

References Cited in the file of this patent

UNITED STATES PATENTS

| | | |
|---|---|---|
| 2,863,894 | Smith | Dec. 9, 1958 |
| 2,892,738 | Dobratz | June 20, 1959 |
| 2,921,876 | Dobratz | Jan. 19, 1960 |

FOREIGN PATENTS

| | | |
|---|---|---|
| 555,857 | Italy | Jan. 31, 1957 |